United States Patent

Kuramochi et al.

[11] Patent Number: 5,957,180
[45] Date of Patent: Sep. 28, 1999

[54] PNEUMATIC TIRE INCLUDING KERFS

[75] Inventors: Izumi Kuramochi; Akinori Tokieda, both of Tokyo, Japan

[73] Assignee: The Yokohama Rubber Co., Ltd., Tokyo, Japan

[21] Appl. No.: 08/945,550

[22] PCT Filed: Mar. 5, 1997

[86] PCT No.: PCT/JP97/00684

§ 371 Date: Nov. 3, 1997

§ 102(e) Date: Nov. 3, 1997

[87] PCT Pub. No.: WO97/32741

PCT Pub. Date: Sep. 12, 1997

[30] Foreign Application Priority Data

Mar. 5, 1996 [JP] Japan .................................. 8-047626

[51] Int. Cl.$^6$ ............................ B60C 11/11; B60C 11/12; B60C 11/13; B60C 107/00

[52] U.S. Cl. ................ 152/209.21; 152/902; 152/DIG. 3

[58] Field of Search ........................... 152/209 R, 209 D, 152/209.18, 209.21, 209.23, 902, DIG. 3

[56] References Cited

U.S. PATENT DOCUMENTS

| | | | |
|---|---|---|---|
| 2,094,636 | 10/1937 | Bull | 152/DIG. 3 |
| 3,893,498 | 7/1975 | Wayne | 152/209 R |
| 3,951,193 | 4/1976 | Yeager | 152/209 R |
| 4,703,788 | 11/1987 | Kusube et al. | 152/209 R |
| 4,854,358 | 8/1989 | Takeuchi | 152/209 R |
| 5,492,161 | 2/1996 | Fuchikami et al. | 152/DIG. 3 |
| 5,814,169 | 9/1998 | Yamaguchi et al. | 152/209 R |

FOREIGN PATENT DOCUMENTS

| | | | |
|---|---|---|---|
| 58-156405 | 9/1983 | Japan | 152/209 D |
| 61-166708 | 7/1986 | Japan . | |
| 64-16406 | 1/1989 | Japan | 152/DIG. 3 |
| 1-215604 | 8/1989 | Japan | 152/209 R |
| 2-128907 | 5/1990 | Japan | 152/209 R |
| 3-143707 | 6/1991 | Japan | 152/209 R |
| 3-197208 | 8/1991 | Japan . | |
| 6-270612 | 9/1994 | Japan . | |
| 6-286422 | 10/1994 | Japan . | |

*Primary Examiner*—Steven D. Maki
*Attorney, Agent, or Firm*—Nikaido, Marmelstein, Murray & Oram LLP

[57] ABSTRACT

A pneumatic tire for a passenger car wherein a plurality of grooves are disposed on a tread surface to define and form land portions, and kerfs which are open to the grooves at at least one of the ends thereof are disposed on the land portions. At least one stage of step portion is disposed in a step shape on at least one of the groove walls of the grooves, and a plurality of kerfs are disposed on the step portion with smaller gaps than those of the kerfs disposed on the land portions.

4 Claims, 2 Drawing Sheets

PNEUMATIC TIRE INCLUDING KERFS

TECHNICAL FIELD

This invention relates to a pneumatic tire for a passenger car. More particularly, this invention relates to a pneumatic tire for a passenger car which improves driving performance on snow and dirt roads without lowering dry performance.

BACKGROUND ART

In pneumatic tires for passenger cars in general, the increase of an edge quantity by increasing the number of blocks and the number of kerfs disposed on the blocks is effective for improving driving performance such as braking/driving performance during driving on snow roads and dirt roads. If the number of blocks is simply increased, however, the blocks are divided into finer blocks and block rigidity drops, so that dry performance drops. The same problem occurs when the number of kerfs is increased.

DISCLOSURE OF THE INVENTION

It is an object of the present invention to provide a pneumatic tire for a passenger car capable of improving driving performance on snow and dirt roads without deteriorating dry performance.

In a pneumatic tire for a passenger car including a plurality of grooves disposed on a tread surface thereof, land portions divided and defined by the grooves and kerfs disposed on the land portions and opening at at least one of the ends thereof to the grooves, the pneumatic tire for a passenger car for accomplishing the object described above is characterized in that at least one stage of step portion is disposed in a step shape on at least one of the grooves walls of the grooves, and kerfs are disposed on this step portion with smaller gaps than those between the kerfs disposed on the land portions.

In the present invention, the grooves described above include at least one main groove extending in a tire circumferential direction and a plurality of transverse grooves extending in a tire width-wise direction.

In the pneumatic tire for a passenger car according to the present invention, the step portion is formed on the groove walls of the grooves, and the kerfs are disposed on the upper surface of the step portion in greater number and with smaller gaps than those between the kerfs disposed on the land portions. Therefore, the kerfs disposed on the step portion exhibit an edge effect against the snow and mud entering the grooves during driving on the snow road and the dirt road.

When the kerfs extending in the tire width-wise direction are disposed on the land portions divided by the main grooves and the kerfs extending in the same direction as the kerfs on the land portions are disposed on the step portion disposed on the wall grooves of the main grooves with smaller gaps than those between the kerfs of the land portions, braking/driving performance on the snow road and the dirt road can be improved.

On the other hand, when the kerfs extending in the tire circumferential direction are disposed on the land portions divided by the transverse grooves and the kerfs extending in the same direction are disposed on the step portion formed on the groove walls of the transverse grooves with smaller gaps than those between the kerfs of the land portions, turning performance on the snow road and the dirt road can be improved by the edge effect of the kerfs extending in the tire circumferential direction. This effect becomes remarkable particularly when the construction described above is provided to the land portions disposed in the shoulder zones of the tread.

The effect of the improvement in braking/driving performance and turning performance on the snow road and the dirt road can be accomplished without increasing the number of blocks and the number of kerfs on the blocks irrespective of these numbers. Therefore, dry performance (dry road maneuvering stability), which is governed mainly by the surface area of the land portions and the degree of rigidly, is not spoiled.

BEST MODE FOR CARRYING OUT THE INVENTION

Figure 1:
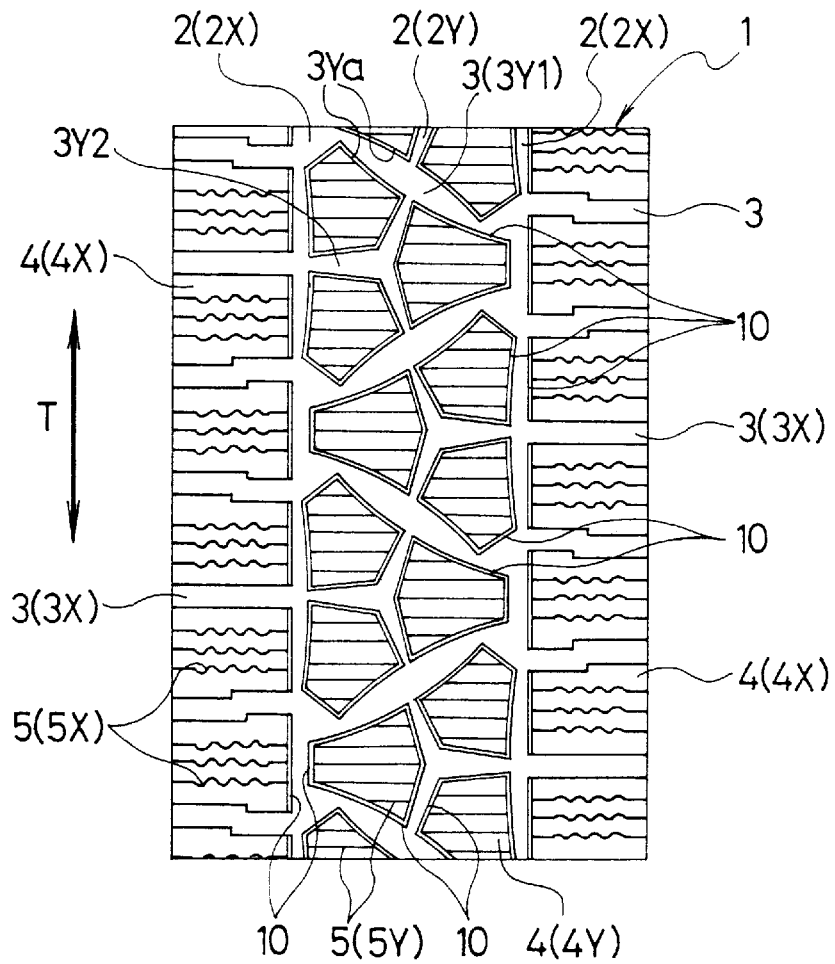
FIG. 1 is a front view of principal portions and shows an example of a tread pattern of a pneumatic tire for passenger cars according to the present invention.

In FIG. 1, reference numeral 1 denotes a tread surface, and three main grooves 2 are so disposed on this tread surface as to extend in a tire circumferential direction T. Both main grooves 2X on the tire external side extend straight while the other one main groove 2Y is disposed zigzag on a tire equator at the tread center portion. A plurality of transverse grooves 3 extending in a tire width-wise direction are disposed at a predetermined pitch in the tire circumferential direction, and a large number of blocks 4 are defined as land portions by these main grooves 2 and transverse grooves 3.

Each block 4Y at the tread center portion between both main grooves 2X is shaped into a pentagonal shape by transverse grooves 3Y1 extending slantingly with respect to the tire width-wise direction between both main grooves 2X and transverse grooves 3Y2 extending in the tire width-wise direction between the main grooves 2X and the main groove 2Y. The blocks 4X at the shoulder portions on the tire external side from both main grooves 2X are arranged so that their front and rear groove walls orthogonally cross the tire circumferential direction by the transverse grooves 3X extending in the tire width-wise direction.

A plurality of kerfs 5, which extend in the tire width-wise direction and both ends of which are open to the main grooves 2, are disposed in each block 4 with a predetermined gap in the tire circumferential direction T. The kerfs 5Y disposed in the block 4Y are shaped into a straight shape. Each kerf 5X disposed in the block 4X has a shape such that both end portions thereof are straight and the intermediate portion connecting with both end portions is zigzag. Each kerf 5 is formed and cut into a depth near the groove bottom of the gain groove 2.

Figure 2:
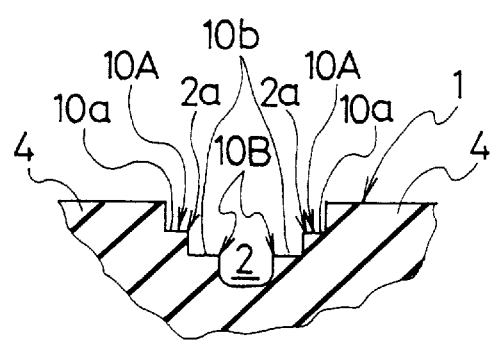
FIG. 2 is an enlarged sectional view and shows an example of step portions disposed on both groove walls of a main groove shown in FIG. 1.
Figure 3:
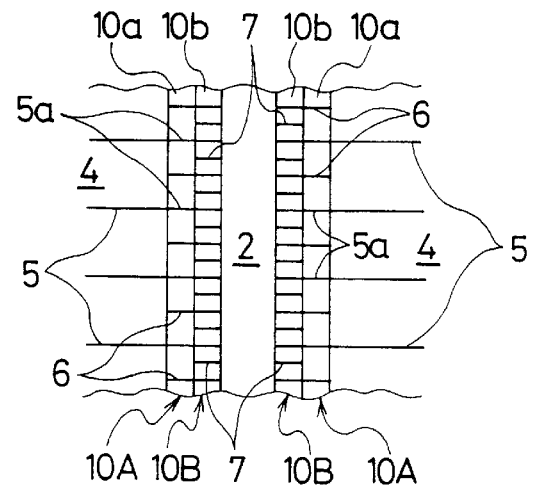
FIG. 3 is a top view of principal portions of FIG. 2.

In the construction of the present invention described above, step portions 10 are formed at both groove walls of the main groove 2. In other words, both groove walls 2a of each main groove 2 are shaped into a step shape having two stages of step portions 10A and 10B as shown in FIG. 2. Straight kerfs 5a, 6 and 7 extending in the tire width-wise direction, which is the same as the direction of the kerfs 5, are formed on the upper surfaces 10a and 10b of the step portions 10A and 10B expanding to each groove wall 2a as shown in FIG. 3.

Each kerf 5a is formed by extending each kerf 5 disposed in the block 4 and communicates with the main groove 2 while crossing transversely the upper surface 10a, 10b of each step portion 10a, 10B. Each kerf 6 is dispose on the step portion 10A, 10B and crosses transversely and completely the upper surfaces 10a, 10b and one of its end is open to the main groove 2. Each kerf 7 is formed on the step portion 10B of the lower stage and crosses transversely the upper surface 10b as a whole and one of its ends is connected to the main groove 2.

Kerfs 5a and 6, whose gaps are narrowed to give more density than the kerfs 5 positioned on the adjacent block surfaces, are disposed on the step portion 10A of upper stage in the tire circumferential direction T. Kerfs 5a, 6 and 7, whose gaps are narrower to give more density than the kerfs on the step portion 10A of upper stage, are disposed on the step portion 10B of the lower stage.

As described above, the step portions 10A, 10B are disposed on the groove walls 2a by utilizing main groove 2 and a greater number of kerfs 5a, 6, 7 than the number of kerfs 5 positioned on the surface block 4 are disposed in the tire circumferential direction. The kerfs 5a, 6 and 7 can exhibit the edge effect against the snow poles and the mud poles entering the main groove 2 when the car drives on a snow road or a dirt road. Consequently, the edge quantity can be increased effectively without dividing finely the blocks or without increasing the number of kerfs on the blocks as in the conventional counter-measures for the snow roads and the dirt roads. As a result, braking/driving performance in driving on the snow roads and the dirt roads can be improved without inviting the drop of dry performance resulting from the decrease of the surface area and rigidity of the blocks.

In FIG. 1, the step portions 10 are disposed on both groove walls of the transverse grooves 3Y1 and 3Y2. Kerfs 5a, 6 and 7 are formed on the step portions 10 disposed on both groove walls 3Ya of each transverse groove 3Y1 inclining to the tire width-wise direction, in the same way as in the case of the step portions 10 of both groove walls 2a of the main groove 2. Since the kerfs extending in the tire width-wise direction are disposed on the step portions of the groove walls 3Ya of the transverse grooves 3Y1 inclining in the tire circumferential direction more densely than the kerfs 5Y of the blocks, the edge quantity can be increased and braking/driving performance in driving on the snow roads and the dirt roads can be further improved.

Figure 4:
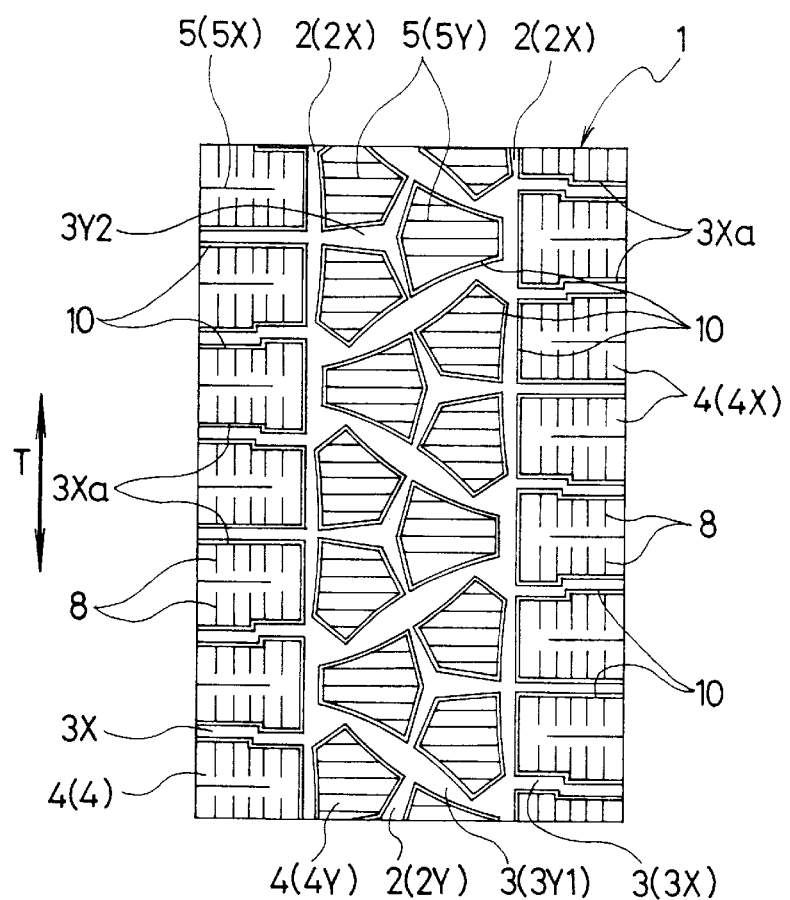
FIG. 4 is a front view of principal portions and shows another example of the tread pattern of a pneumatic tire for passenger cars according to the present invention.

FIG. 4 shows another example of the pneumatic tire according to the present invention. In this embodiment, the step portions 10 are disposed further on both groove walls 3Xa of the transverse grooves 3X of the shoulder portions. A plurality of kerfs 8 reaching a depth near the groove bottom of each transverse groove 3 are so disposed as to oppose one another with a predetermined gap on both front and rear sides, in the tire circumferential direction, of each block 4X of the shoulder portion. Each kerf 8 extends while crossing orthogonally the tire width-wise direction, and only one of its ends communicates with the transverse groove 3. The step portions 10 having the same construction as described above are disposed on both groove walls 3Xa of each transverse groove 3X to which these kerfs 8 are open.

At these step portions 10, the kerfs 5a, 6 and 7 formed on the upper surfaces 10a and 10b of the two stages of the step portions 10A and 10B extend in the tire circumferential direction in the same way as the kerfs 8, and one of the ends of each kerf is open to the transverse groove 3. The step portions 10 are disposed also on the groove walls 3Xa of the transverse grooves 3X defining the front and rear portions of the block 4X having the kerfs 8 formed in this way in the tire circumferential direction, and the kerfs 5a, 6 and 7 extending in the same direction as the kerfs 8 are disposed on the step portions 10 more densely than the kerfs 8 on the surface of the blocks 4X. In this way, the edge effect in the tire width-wise direction, that is necessary for supporting the centrifugal force when the car turns can be improved in addition to the edge effect in the tire circumferential direction that is necessary for braking and driving when the car drives straight. In consequence, both of braking/driving performance and turning performance during driving on the snow roads and the dirt roads can be improved without lowering dry performance. The ground contact pressure of the tread center portion becomes higher during straight driving and the ground contact pressure of the shoulder portions becomes higher during turning. Therefore, the effects described above can be further improved by constituting the blocks 4Y at the center portion and the blocks 4X at the shoulder portions in the same way as the tread pattern shown in FIG. 4.

In the present invention, the step portions 10 are shown formed in two stages, but one, or not less than three stages, may be disposed. Preferably, two or three stages of step portions 10 are disposed.

When the step portions are disposed in a plurality of stages and slot-like kerfs are formed in these stage portions, the number of kerfs are preferably increased so that the gaps between them become progressively smaller towards the lower stages on the groove bottom side. As a result, driving performance can be improved more effectively while avoiding the drop of the block rigidity.

The number of kerfs disposed on each step portion 10A, 10B is preferably increased to 1.5 to 6 times the number of kerfs disposed in the stage portion immediately above each stage (the number of kerfs disposed in the block 4 in the case of the uppermost stage portion 10A). Alternatively, the gaps of the kerfs disposed on the stage portions preferably become progressively smaller towards the lower stages at a rate of 1/1.5 to 1/6 of the kerf gaps disposed on the step portion of the block (land portion).

In the embodiment described above, the step portions 10 are disposed on both groove walls of the grooves 2 and 3, but it is also possible to dispose the step portions 10 on only one of the groove walls and to form the kerfs 5a, 6 and 7 on them.

The depth of the kerfs 5a, 6 and 7 is preferably the same as the depth of the kerfs 5 of the block 4, and preferably reaches a depth near the groove bottom of the grooves 2 and 3.

The upper surfaces 10a and 10b of the step portions 10A and 10B are shaped into the flat surfaces in parallel with the adjacent block surfaces in the embodiment shown in FIGS. 1 and 4 but they may be slope surfaces whose side facing the grooves is lowered.

The embodiment shown in FIG. 4 represents the example where the step portions and the kerfs are disposed on the groove walls of the main grooves 2 and the transverse grooves 3, respectively, but the step portions and the kerfs may be disposed on only the transverse grooves 3. According to this construction, turning performance on the snow road and the dirt road can be improved without lowering dry performance.

The embodiment described above has been explained about the pneumatic tire the tread pattern of which includes the land portions comprising the blocks, but the land portion in the present invention may be a land portion comprising ribs divided and defined by at least one main groove, and the transverse grooves may be lug grooves.

The term "pneumatic tire for passenger cars" in the present invention means those pneumatic tires which are used for ordinary passenger cars and recreational vehicles (RV) for home use with the exception of heavy load pneumatic tires for trucks and buses and pneumatic tires for light trucks for transporting cargos.

EXAMPLE 1

Pneumatic tires 1, 2 according to the present invention, a comparative pneumatic tire and a conventional pneumatic tire were manufactured. The size of all of these tires is 265/70R15. The tire 1 of the invention has a block pattern shown in FIG. 1 disposing two stages of step portions on both groove walls of main grooves and disposing kerfs on these step portions more densely than kerfs disposed on the blocks. The tire 2 of the invention has kerfs on the two stages of step portions disposed on both groove walls of the transverse grooves inclining in a tire width-wise direction and crossing the main grooves in addition to the construction of the tire 1. The comparative tire has the same number of kerfs on the step portions as the number of kerfs on the block in the tire 1, and a conventional tire doesn't have the step portions and the kerfs in the tire 1.

In the tire 1, 2 of the invention, the kerfs were disposed at a 6 mm pitch in each block, at a 3 mm pitch on the step portion of the upper stage and at a 1.5 mm pitch on the step portion of the lower stage. The ratio of increment of the kerfs was twice for each stage with respect to the upper stage.

Each of these test tires was fitted to a rim having a rim size of 15×7JJ, and these tires were fitted at a pneumatic pressure of 200 kPa to a passenger car of a 3,000 cc class, and braking/driving performance on both snow and dirt roads and maneuvering stability on a dry road were evaluated under the following conditions. The test results were tabulated in Table 1.

[Snow road braking/driving performance]

Driving and braking were repeatedly carried out on a snow road test course at a temperature of −5 to −8° C., a snow temperature of −5 to −8° C. and a snow depth of 5 cm, and snow road braking/driving performance was evaluated by a feeling test by test drivers. The results were expressed by using the value of the conventional tire as an index value of 100. The greater this value, the more excellent snow road braking/driving performance.

[Dirt road braking/driving performance]

Driving and braking were repeatedly carried out on a dirt road of a dirt trial circuit and dirt road braking/driving performance was evaluated by a feeling test by test drivers. The result was expressed by using the value of the conventional tire as an index value of 100. The greater this value, the more excellent dirt road braking/driving performance.

[Dry road maneuvering stability]

A feeling test by test drivers was carried out in a test course under a dry state and the result was expressed by using the value of the conventional tire as an index value of 100. The greater this value, the more excellent dry road maneuvering stability.

TABLE 1

|  | Tire 1 of the invention | Tire 2 of the invention | Comparative Tire | Conventional Tire |
| --- | --- | --- | --- | --- |
| snow road driing/braking performance | 110 | 114 | 103 | 100 |
| dirt road braking/driving performance | 105 | 107 | 102 | 100 |
| dry road maneuvering stability | 100 | 100 | 100 | 100 |

It could be understood clearly from Table 1 that the tires according to the present invention could effectively improve braking/driving performance in driving on the snow road and the dirt road without deteriorating dry performance.

It could be understood also from the tire 2 according to the present invention that braking/driving performance on both the snow and dirt roads could be improved further by disposing the step portions on both groove walls of each transverse groove which was so inclined in the tire width-wise direction as to cross the main groove, and disposing the kerfs on these step portions more densely than the kerfs of the blocks.

EXAMPLE 2

Pneumatic tires 3~5 according to the present invention were manufactured. The size of all of these tires is 265/70R15. The tire 3 of the invention has a block pattern with kerfs on each block shown in FIG. 4 disposing two stages of step portions on both groove walls of the main grooves and the transverse grooves slantingly crossing the main groove in a tire width-wise direction and disposing the kerfs on these step portions more densely than the kerfs disposed on the blocks. The tire 4 of the invention has further two stages of step portions on both groove walls of the transverse grooves in the shoulder portions and kerfs on them more densely than the kerfs on the blocks in addition to the construction of the Tire 3. The tire 5 of the invention has a same number of kerfs on the step portions of the transverse grooves in the shoulder portions as the number of kerfs of the blocks in the tire 4.

The gaps of the kerfs of each block, the step portion of the upper stage and the step portion of the lower stage of each test tire were the same as those of Example 1.

Each test tire was fitted to a passenger car of a 3,000 cc class in the same way as in Example 1, and an evaluation test of turning performance on the snow and dirt roads was carried out under the following measurement condition. Further, dry road maneuvering stability evaluation test was conducted under the measurement condition described above, and the results were tabulated in Table 2. In Table 2, however, dry road maneuvering stability was expressed by using the value of the tire 3 of the invention as an index value of 100.

[Snow road turning performance]

Turning was repeated in the snow test course having the same condition as described above, and snow road turning performance was evaluated by a feeling test by test drivers. The result was expressed by using the value of the tire 3 of the invention as an index value of 100. The greater this value, the more excellent snow road turning performance.

[Dirt road turning performance]

Turning was repeated on the dirt road in the dirt trial circuit and dirt road turning performance was evaluated by a feeling test by test drivers. The result was expressed by using the value of the tire 3 of the invention as an index value of 100. The greater this value, the more excellent dirt road turning performance.

TABLE 2

|  | Tire 3 of the invention | Tire 4 of the invention | Tire 5 of the invention |
| --- | --- | --- | --- |
| snow road turing performance | 100 | 100 | 103 |
| dirt road turing performance | 100 | 105 | 102 |
| dry road maneuvering stability | 100 | 100 | 100 |

It could be understood from Table 2 that turning performance on both the snow and dirt roads could be improved by disposing the step portions on the groove walls of the transverse grooves of the shoulder portions and disposing the kerfs extending in the tire circumferential direction on these step portions more densely than the kerfs of the blocks.

As described above, in the present invention, the groove walls of the grooves are shaped into the step shape and a plurality of kerfs are disposed on these step portions more densely than the kerfs disposed on the land portions. Therefore, the kerfs disposed on the step portions exhibit the edge effect against the snow columns and the mud columns entering the grooves during driving on the snow road and the dirt road. As a result, driving performance on the snow and dirt roads can be improved without spoiling dry performance.

INDUSTRIAL APPLICABILITY

The present invention having the excellent effects described above can be utilized extremely effectively for pneumatic tires for passenger cars driving on the snow road and the dirt road such as pneumatics tire for RVs (recreation vehicles).

What is claimed is:

1. A pneumatic tire for a passenger car having a plurality of grooves on a tread surface thereof, land portions formed by said grooves, and kerfs disposed on said land portions such that each kerf has at least one end open to one of said grooves, wherein at least two step portions are disposed on at least one of the groove walls of said grooves, a plurality of kerfs are disposed on each of said step portions with smaller gaps therebetween than gaps between said kerfs disposed on said land portions, and the gaps between said kerfs disposed on each of said step portions become progressively smaller towards the lower step portion.

2. A pneumatic tire for a passenger car having a plurality of grooves on a tread surface thereof, said grooves being main grooves extending in a tire circumferential direction and a plurality of transverse grooves extending in a tire width-wise direction, land portions formed by said grooves, said main grooves and said transverse grooves being so arranged as to define said land portions as being blocks, and kerfs disposed on said land portions such that each kerf has at least one end open to one of said grooves, wherein at least one stage of a step portion is disposed on at least one of the groove walls of said grooves, a plurality of kerfs are disposed on said step portion with smaller gaps therebetween than gaps between said kerfs disposed on said land portions, said kerfs disposed on said land portions comprise kerfs disposed on blocks in a tread center portion, the kerfs disposed on the blocks in the tread center portion extending in the tire width-wise direction and having both ends opening to said main grooves, said step portion being disposed on at least one wall of one of said main grooves, and the kerfs disposed on said step portion and the kerfs disposed on said blocks in the tread center portion extending in the same direction, one of said main grooves is disposed zigzag at the tread center portion, said transverse grooves are so arranged as to cross slantingly said zigzag main groove in the tire widthwise direction, said kerfs disposed on said blocks in the tread center portion and extending in the tire width-wise direction are allowed to communicate with said transverse grooves, at least one stage of a step portion is formed on at least one of the groove walls of said transverse grooves, and a plurality of kerfs extending in the same direction as said kerfs on said blocks in the tread center portion are disposed on said step portion on said at least one of the groove walls of said transverse grooves with smaller gaps therebetween than gaps between said kerfs on said blocks in the tread center portion.

3. A pneumatic tire for a passenger car having a plurality of grooves on a tread surface thereof, said grooves being main grooves extending in a tire circumferential direction and a plurality of transverse grooves extending in a tire width-wise direction, land portions formed by said grooves, said main grooves and said transverse grooves being so arranged as to define said land portions as being blocks, and kerfs disposed on said land portions such that each kerf has at least one end open to one of said grooves, wherein at least one stage of a step portion is disposed on at least one of the groove walls of said grooves, a plurality of kerfs are disposed on said step portion with smaller gaps therebetween than gaps between said kerfs disposed on said land portions, said kerfs disposed on said land portions comprise kerfs disposed on blocks in a tread center portion, the kerfs disposed on the blocks in the tread center portion extending in the tire width-wise direction and having both ends opening to said main grooves, said step portion being disposed on at least one wall of one of said main grooves, and the kerfs disposed on said step portion and the kerfs disposed on said blocks in the tread center portion extending in the same direction, a plurality of kerfs extending in the tire circumferential direction and opening to said transverse grooves at at least one of the ends thereof are disposed on blocks at shoulder portions which are external said main grooves, at least one stage of a step portion is formed on at least one of the groove walls of said transverse grooves, and a plurality of kerfs extending in the same direction as said kerfs disposed on said blocks at said shoulder portions are disposed on said step portion on said at least one of the groove walls of said transverse grooves with smaller gaps therebetween than gaps between said kerfs on said blocks at said shoulder portions.

4. A pneumatic tire for a passenger car according to claim 3, wherein one of said main grooves is disposed zigzag at the tread center portion, said transverse grooves are so arranged as to incline in the tire width-wise direction and to cross said zigzag main groove, said kerfs disposed on said blocks in the tread center portion and extending in the tire width-wise direction are allowed to communicate with said transverse grooves, at least one stage of a step portion is formed on at least one of the groove walls of said transverse grooves in the tread center portion, and a plurality of kerfs extending in the same direction as said kerfs on said blocks in the tread center portion are disposed on said step portion on said at least one of the groove walls of said transverse grooves in the tread center portion with smaller gaps therebetween than gaps between said kerfs on said blocks in the tread center portion.

* * * * *